(12) United States Patent
Artiuch et al.

(10) Patent No.: US 11,573,117 B2
(45) Date of Patent: Feb. 7, 2023

(54) MONITORING ROTARY GAS METER HEALTH BY ANALYZING DIFFERENTIAL PRESSURE ACROSS THE ROTATING ELEMENT

(71) Applicant: Natural Gas Solutions North America, LLC, Houston, TX (US)

(72) Inventors: Roman Leon Artiuch, Houston, TX (US); Jeff Thomas Martin, Spring, TX (US); Paul Stephen Hooks, Halstead (GB)

(73) Assignee: Natural Gas Solutions North America, LLC, Houston, TX (US)

( * ) Notice: Subject to any disclaimer, the term of this patent is extended or adjusted under 35 U.S.C. 154(b) by 413 days.

(21) Appl. No.: 16/810,047

(22) Filed: Mar. 5, 2020

(65) Prior Publication Data
US 2021/0278269 A1     Sep. 9, 2021

(51) Int. Cl.
*G01F 5/00*     (2006.01)
*G01F 25/10*    (2022.01)
*G01F 15/02*    (2006.01)

(52) U.S. Cl.
CPC .............. *G01F 25/15* (2022.01); *G01F 5/005* (2013.01); *G01F 15/02* (2013.01)

(58) Field of Classification Search
None
See application file for complete search history.

(56) References Cited

U.S. PATENT DOCUMENTS

| | | | |
|---|---|---|---|
| 7,295,934 B2 | 11/2007 | Hairston | |
| 7,765,873 B2* | 8/2010 | Klosinski | F01D 21/003 73/714 |
| 8,639,464 B2* | 1/2014 | Artiuch | G01F 25/10 702/45 |
| 8,812,253 B2 | 8/2014 | Davis et al. | |
| 11,187,223 B2* | 11/2021 | Ward | F04D 13/12 |
| 2007/0213949 A1 | 9/2007 | Artiuch et al. | |
| 2008/0215259 A1 | 8/2008 | Hairston | |
| 2009/0035121 A1* | 2/2009 | Watson | F01C 1/126 73/861.87 |
| 2009/0187356 A1 | 7/2009 | Artiuch | |
| 2011/0154242 A1 | 6/2011 | Stevens et al. | |
| 2016/0084687 A1* | 3/2016 | Steven | G01F 25/10 73/861.42 |
| 2017/0023393 A1 | 1/2017 | Wiklund et al. | |
| 2018/0058907 A1 | 3/2018 | Kn | |

OTHER PUBLICATIONS

Dresser Natural Gas Solutions, Dresser Series B3 Rotary Meter Installation, Operation and Maintenance Manual, 2018.

* cited by examiner

*Primary Examiner* — Harshad R Patel
(74) *Attorney, Agent, or Firm* — Paul Frank + Collins P.C.

(57) ABSTRACT

A gas meter is configured for diagnostics using differential pressure (DP) measurements. The configurations include executable instructions to actively manage the DP sensor. These instructions active the DP sensor only during stable flow and, where applicable, for a defined test time period. This feature manages power consumption to maintain battery life with acceptable standards or regulations.

20 Claims, 11 Drawing Sheets

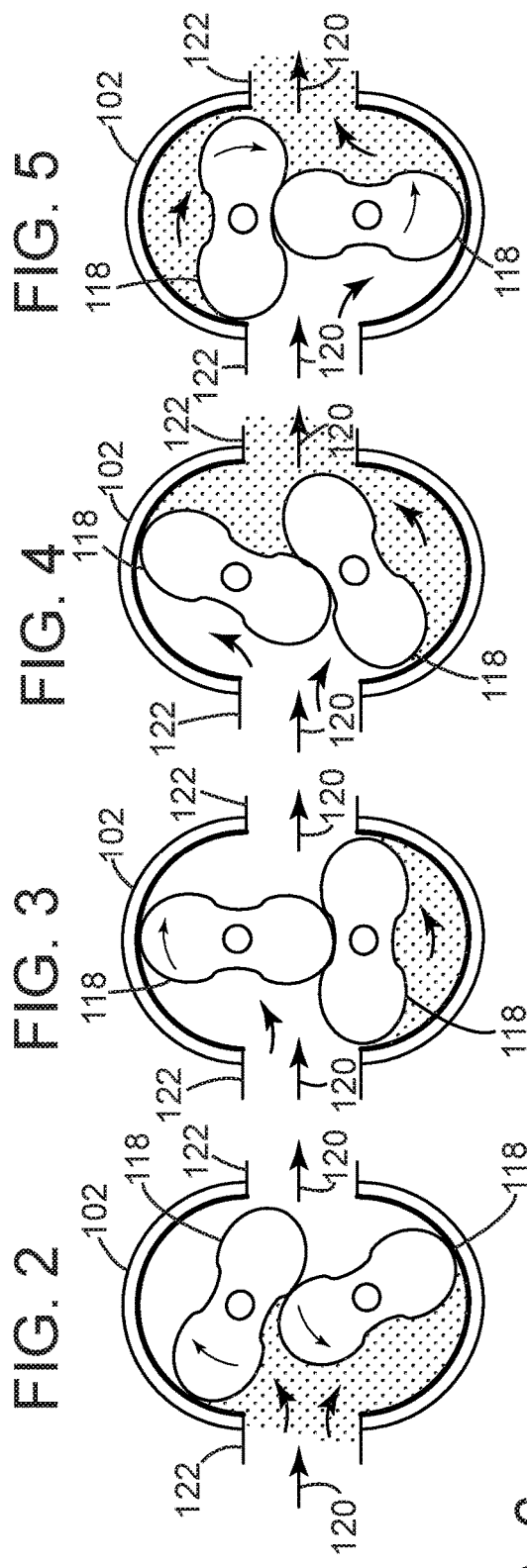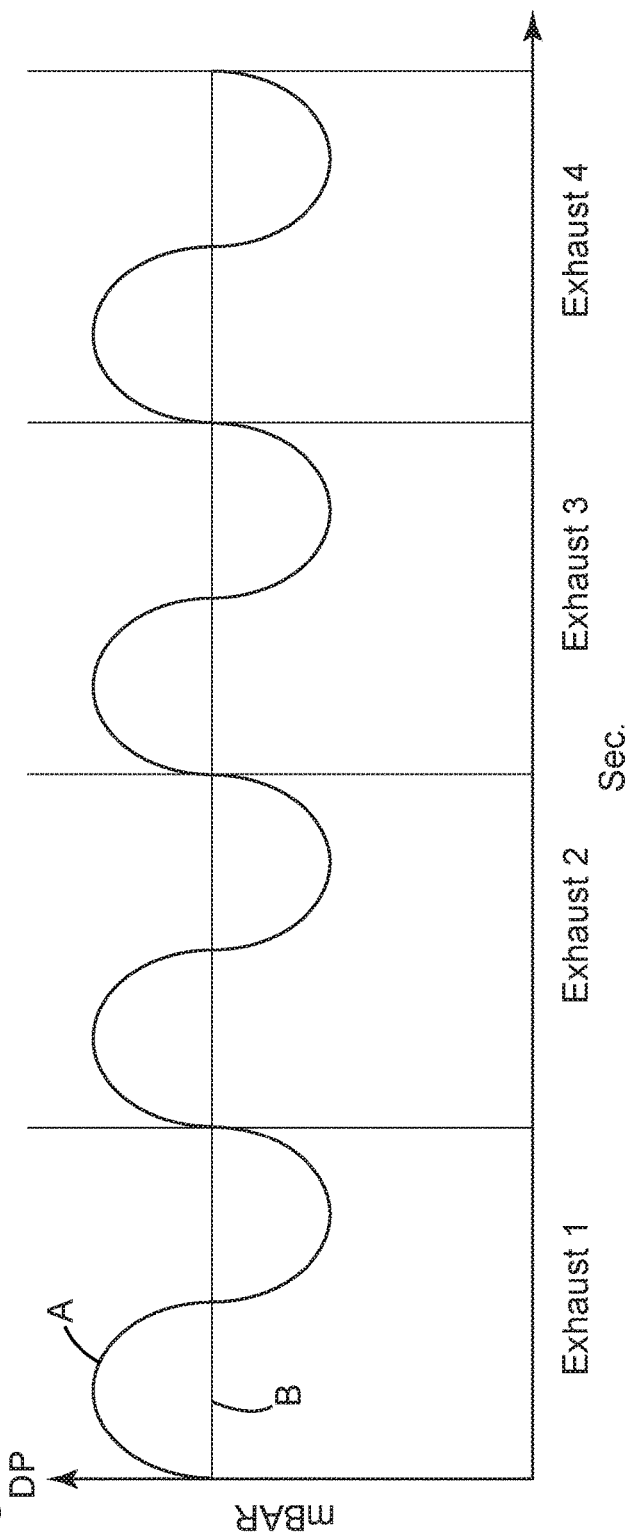

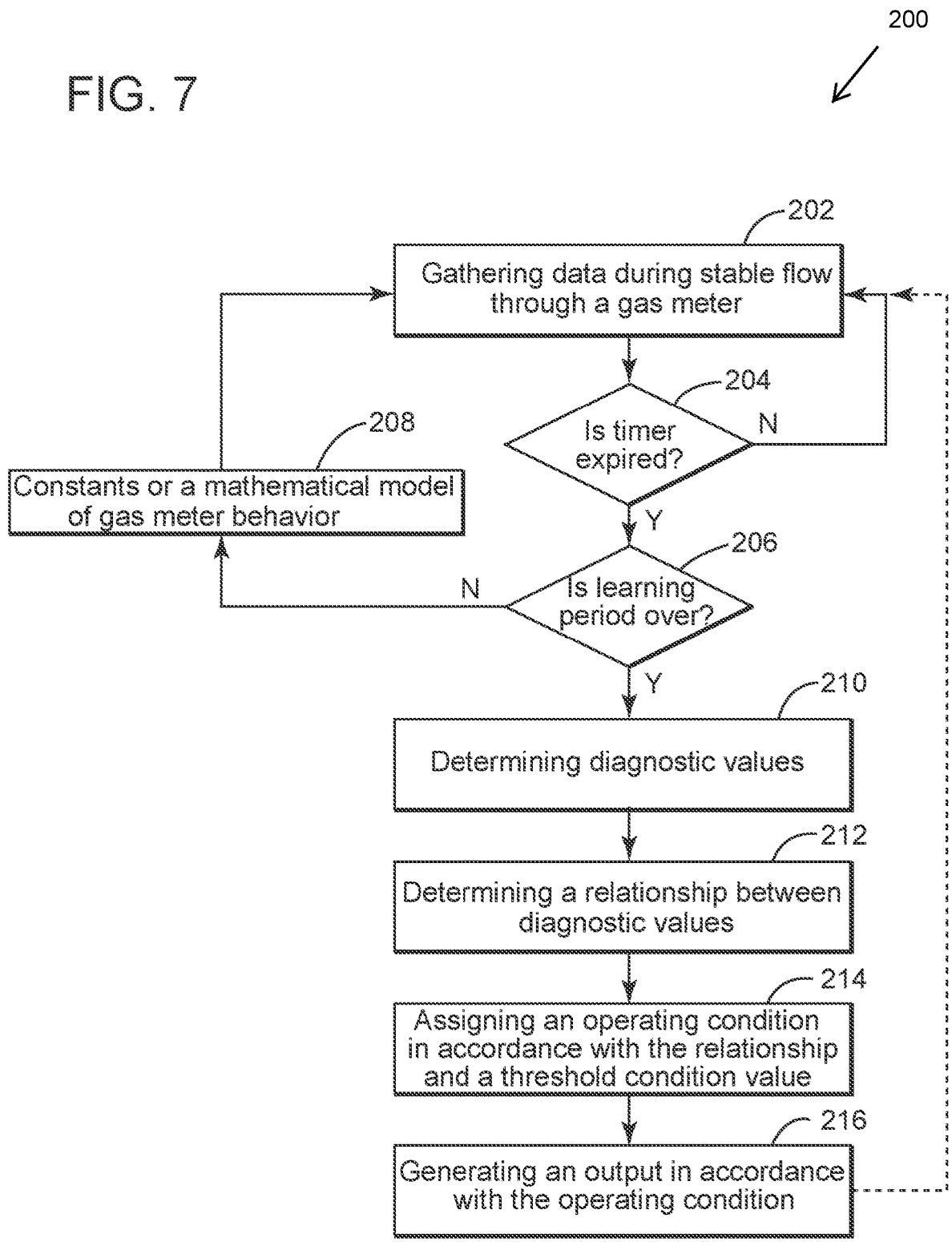

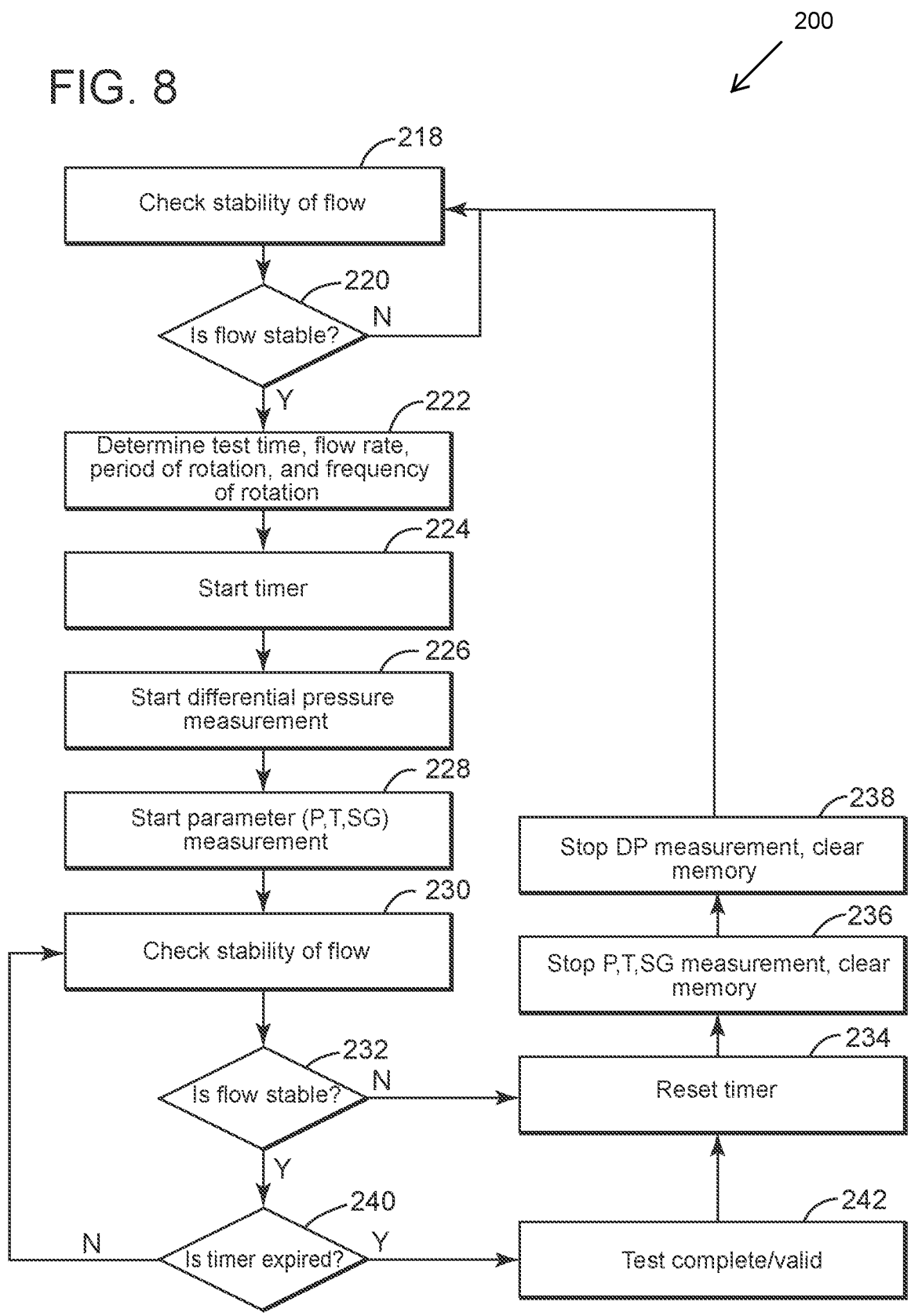

MONITORING ROTARY GAS METER HEALTH BY ANALYZING DIFFERENTIAL PRESSURE ACROSS THE ROTATING ELEMENT

BACKGROUND

Flow meters are valuable to natural gas and other "resource" distribution companies. Utilities may install the devices at various locations along distribution lines to generate data that corresponds with flow of a resource, like water or natural gas. This data may, in turn, find use to calculate values that the utilities can leverage to bill customers or to manage inventory. Gas meters may employ electronics to "correct" these values for variations in properties of natural gas that occur naturally in respect of temperature and pressure at the gas meter. These electronics may also serve as a platform to monitor performance of the gas meter as it operates in the field. Data from this platform may help utilities diagnose potential or real-time performance issues that may arise from time-to-time on these machines. Where applicable, the utility may rely on these diagnostics to efficiently allocate labor (and other company resources) to attend to difficult gas meters in the field that might become a liability because of their diminished ability to accurately or reliability measure volumetric flow of gas.

SUMMARY

The subject matter herein relates to improvements to electronics on gas meters (and other flow meters) to better monitor health of the device. Of particular interest herein are embodiments that can perform diagnostics at low flow rates. These embodiments may employ hardware and algorithms that permit diagnostics for flow at least as low as 5% of the maximum flow rate across the device. This feature addresses a propensity of end users (e.g., utilities) to "oversize" flow meters on their distribution systems. This decision may frustrate diagnostics in the field because flow rate rarely exceeds the "lower limit" flow rate for effective diagnostics to occur on the device (e.g., 30% of maximum flowrate). As noted below, the proposed design collects data at lower flow rates, including differential pressure (DP) data. This feature is useful on positive displacement meters, which may use counter-rotating impellers as its metering mechanics, because changes in DP correlate well with performance of impellers. The data is useful, then, as basis to identify bearing wear or contamination that may impact volume measurement accuracy because gas can leak around the impellers. Another benefit is that the proposed design may gather data at more advantageous times, like during periods of identifiable stable flow, while at the same time extending useable life of the on-board battery or other in-situ power supply.

DRAWINGS

Reference is now made briefly to the accompanying drawings, in which:

FIG. 2 depicts a schematic diagram of the gas meter of FIG. 1;

FIG. 3 depicts a schematic diagram of the gas meter of FIG. 1;

FIG. 4 depicts a schematic diagram of the gas meter of FIG. 1;

FIG. 5 depicts a schematic diagram of the gas meter of FIG. 1;

FIG. 6 depicts an exemplary plot of differential pressure across the gas meter of FIG. 1;

FIG. 7 depicts a flow diagram of an exemplary embodiment of a method for performing diagnostics on the gas meter of FIG. 1;

FIG. 8 depicts a flow diagram of an example of the method of FIG. 7;

Figure 1:
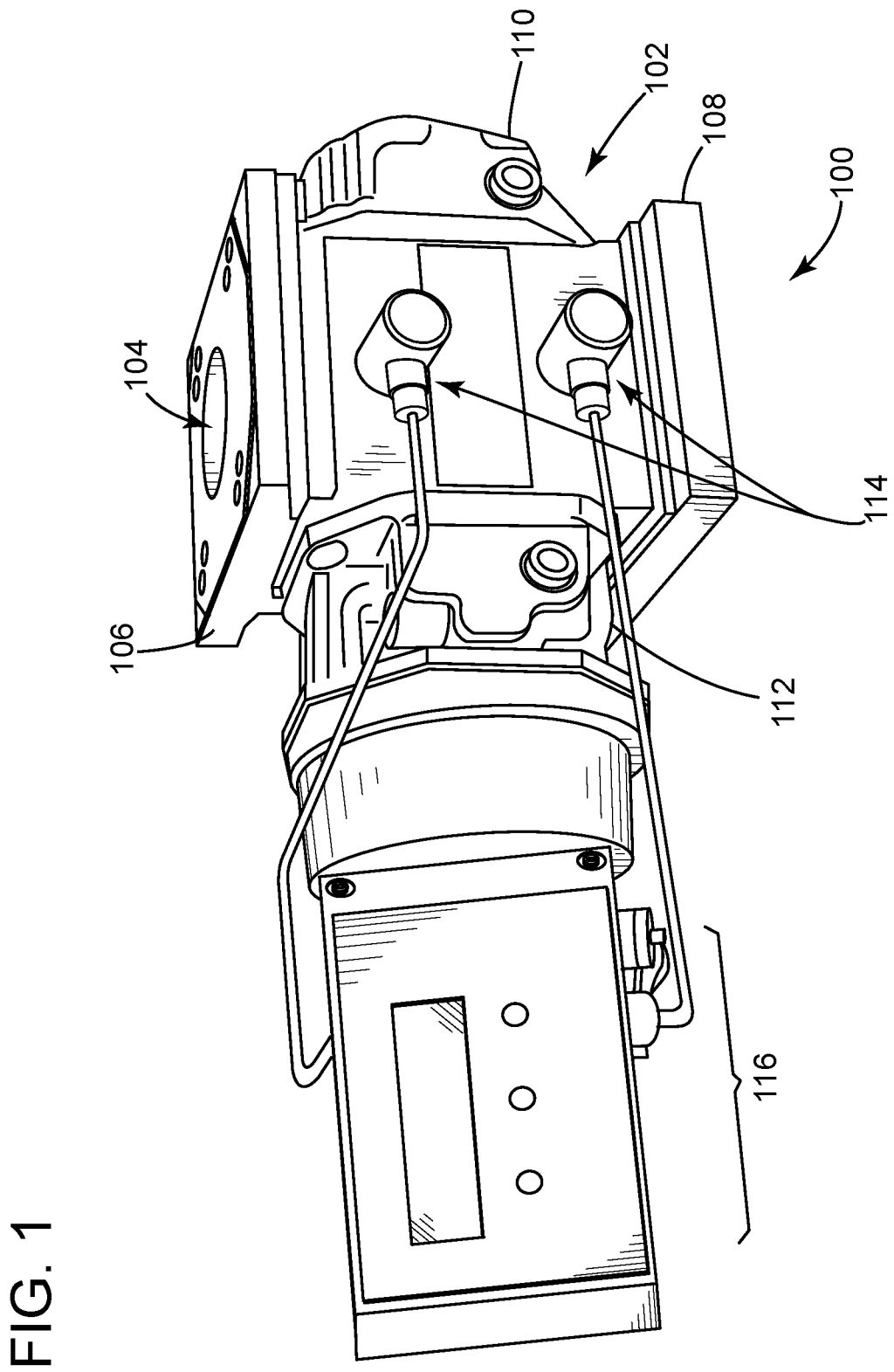
FIG. 1 depicts a perspective view of an exemplary embodiment of a gas meter.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion now turns to describe various features found in the drawings above. These features may form part of a gas meter that employs algorithms designed to gather data at particularly advantageous times, including differential pressure (DP) data. For years, DP testing was done by an end user (or operator) in the field with a portable manometer. The operator would collect data to compare with a baseline DP characteristic for the device, typically a curve that plots DP measurements against a range of flow rates. This baseline was often the result of testing done at a factory as part of the assembly process. Eventually advances in technology became available to develop baseline characteristics on-board the device in the field. These capabilities may aggregate data over a period of time, like one (1) year, so that the device can "learn" the baseline value(s) or "constants." The technology also provides processing capabilities sufficient to analyze the data according to mathematical models of behavior of the gas meter. These models may predict or diagnose conditions on the device, for example, by relating DP measurements to health of the gas meter. Applicable models may vary as necessary.

These capabilities are not without their limitations. Electronics necessary to process data for purposes of diagnostics consume a good deal of energy. This feature poses a problem in the field because of the finite life-span of on-board batteries. The proposed design is beneficial because the gas meter uses less energy for diagnostics, while at the same time providing DP measurements (and other data) for analysis that is more likely to prove fruitful in diagnosing problems, if any should prevail on the device. Other embodiments are within the subject matter of this disclosure.

FIG. 1 depicts a perspective view of an example of a flow meter in the form of a gas meter 100. This example may have a meter body 102, typically a cast or machined metal housing with a "pass-through" flow path 104 that terminates at flanged ends (e.g., a first flanged end 106 and a second flanged end 108). Covers 110, 112 may attach to opposite sides of the metal housing 102. The covers 110 allow access to an interior cavity where mechanics reside in the flow path 104. The gas meter 100 may also include a differential pressure (DP) unit 114 to monitor differential pressure across these mechanics. The DP unit 114 may direct fluid from the flow path 104 to an electronics unit 116 that is useful to generate, collect, and process data. Circuitry in the electronics unit 116 may include a DP sensor (not shown) that can measure differential pressure from the inputs from the DP unit 114. This DP sensor can activate and de-activate as necessary to gather DP data.

FIGS. 2, 3, 4, and 5 depict schematic diagrams of the cross-section of an example of the gas meter 100 of FIG. 1. Positive-displacement type devices may include mechanics 118, like a pair of lobed-impellers that precisely mesh with one another. The impellers 118 counter-rotate in response to flow of fluid 120 through the flow path 104. The diagrams reflect configurations of the impellers 118 that occur during one complete "revolution" of the impellers 118. Each configuration exhausts a precise amount or volume of fluid 120 from the flow path 104 to conduit 122 that attaches downstream of the device.

FIG. 6 depicts an exemplary plot of differential pressure (DP) across the impellers 118. Curve A represents measured values of DP (or "measured DP"). During stable flow, measured DP may exhibit a sinusoidal wave form with a period that corresponds with the "exhaust" configurations. Curve B represents the average of the measured DP values (or "average DP"). This value may be useful in the mathematical models for diagnostics because it negates variations or fluctuations in measured DP. In this regard, the methods herein take advantage of the sinusoidal wave form to manage operation of the DP sensor that generates the measured DP data. This feature provides better "good" data to determine average DP, which in turn improves accuracy and reliability of the on-board diagnostics. As an added benefit, these methods may save energy because the DP sensor only operates at times at which it will secure this "good" data, and not in any haphazard, random, or pre-determined pattern of operation that would be less likely to guarantee data that is suitable for diagnostics.

FIG. 7 depicts a flow diagram of an exemplary method 200 for functionality on-board the gas meter 100 to operate the DP sensor to gather data and to perform diagnostics and other health-related functions. These diagrams outline stages that may embody executable instructions for one or more computer-implemented methods or processes. The executable instructions may instantiate a computer program, software, firmware, or like compilation of machine-readable instructions. The stages in these methods may be altered, combined, omitted, or rearranged in some embodiments.

The method 200 may enable the electronics unit 116 to perform diagnostics for flow below the "lower limit" flow rate. The method 200 may include, at stage 202, gathering data during a period of stable flow through the gas meter. The method 200 may also include, at stage 204, monitoring a timer. In one implementation, the method 200 may include a stages for a learning mode, for example, at stage 206, monitoring a learning period and, at stage 208, calculating constants for a mathematical model of gas meter behavior. At stage 210, the method 200 may include determining diagnostic values at expiration of the timer. The method 200 may further include, at stage 212, determining a relationship between diagnostic values. The method 200 may also include, at stage 214, assigning an operating condition and, at stage 216, generating an output in accordance with the operating condition.

At stage 202, the method 200 may gather data during a period of stable flow through the meter body 102. The period of stable flow likely corresponds with constant (or relatively constant) demand downstream of the gas meter 100. This demand results in a flow of fuel gas that exercises the impellers 118. The flow may cause the impellers 118 to counter-rotate, which in turn may generate the motion signal $S_M$ as a series of consistent or repeatable pulses. Notably, while periods of stable flow may occur fairly frequently, it is not often that the flow reaches the flowrate necessary to implement any diagnostics. It could be weeks or months before flowrate has characteristics that are appropriate for DP measurements. The method 200 is beneficial because it avoids exhausting battery power by collecting data unnecessarily during these potentially long periods of delay between stable flow.

At stage 204, the method 200 may monitor a timer to regulate use of the differential pressure sensor 134. This timer may embody certain stages that increment some value of time (e.g., seconds). These stages may also activate or monitor electronic hardware, including discrete or solid-state devices, for this purpose as well. In one implementation, the method 200 may include one or more stages for operating the timer, for example, stages for activating the timer, incrementing the timer, and resetting the timer (where necessary). The method 200 may reset the timer in response to changes in stability of the flow, e.g., where the flow becomes unstable. The unstable flow may cause the timer to reset. The method 200 may concomitantly deactivate the DP sensor as well. During stable flow, the timer may continue to increment until it reaches a maximum value that measures the extent of activation desired for the DP sensor. These features can regulate regulates power draw, for example, by limiting the activation time of the DP sensor.

At stages 206, 208, the method 200 may operate in a "learning mode." This mode may occur early in the lifetime of the gas meter 100, for example, soon after it is put into service. The method 200 may continue in the learning mode for a specified period of time. This period may last for one (1) year after installation or, for example, long enough for the device to collect data sample sets from all seasons that the gas meter 100 experiences in the field; however this disclosure does contemplate that the sample period may be shorter or longer as desired. In one implementation, the learning mode may result in a value for one or more constants of the mathematical model of gas meter behavior. Exemplary values or constants may correspond with Equations (1), (2), and (3) below:

$$DP_{avk} = \frac{\sum DP_i}{n}, \quad \text{Equation (1)}$$

$$\alpha_k = \frac{(DP_{avk} \times T_k)}{P_k \times Q_k^2 \times SG_k}, \quad \text{Equation (2)}$$

$$\alpha = \frac{\sum \alpha_k}{m}, \quad \text{Equation (3)}$$

where α is the constant, $DP_{av}$ is average DP, $DP_i$ is measured DP for a single data set i, n is the number of measured DP values, m is the number of calculated α values, and T, P, and SG are parameters or conditions of the fluid (e.g., T is temperature, P is pressure, and SG is specific gravity), and Q is flow rate. All values are associated with "k" conditions, which are preferably stable for pressure, specific gravity (or other parameters of gas composition), and temperature. In one implementation, one or more of these parameters (e.g., T, P, SG, etc.) may be of a pre-determined or "un-measured" value. An end user (e.g., operator, technician, etc) may input these values into a user interface or other software generated input screen or they may pre-populate a memory or storage device. Some embodiments may include sensors that measure these parameters in "real-time," effectively concomitantly with operation of the gas meter 100, particularly during periods of stable flow through the device.

At stage 210, the method 200 may use the constant α and other data to determine values that are useful to diagnose heath of the gas meter 100. These "diagnostic" values may relate to measured DP across the impellers 118. In one implementation, the diagnostic values may correspond with Equation (4) below:

$$DP_{av} = \sum \frac{DP_i}{p}, \quad \text{Equation (4)}$$

where $DP_{av}$ is the average DP, $DP_i$ are the measured DP values in the data sample, and p is the number of data points in the sample set. The diagnostic values may also correspond with Equation (5) below:

$$DP_b = \frac{\alpha(P \times Q^2 \times SG)}{T}, \quad \text{Equation (5)}$$

where $DP_b$ is a base value of DP, α is the constant, P is pressure, Q is flow rate, SG is specific gravity, and T is temperature.

At stage 212, the method 200 may determine the relationship between diagnostic values. This stage may include stages for comparing the average DP ($DP_{av}$) to the base DP ($DP_b$). The result may indicate that $DP_{av}$ is greater than, less than, or the same as $DP_b$. Notably, values for $DP_{av}$ may correspond with consecutive measurements, either that are taken during the period of stable flow or taken during the requisite "test period" noted above. The values for $DP_b$, on the other hand, relate to the constant α or values collected over a longer period of time. These values characterize operation as means to establish whether a device malfunction or other operating condition is present on the gas meter 100.

At stage 214, the method 200 may assign the operating condition. Examples of the operating condition may require the end user to perform various tasks, including periodic or regular maintenance, repair, or replace the gas meter 100. In some implementations, the operating condition may depend on one or more coefficients with values that can weight one or both of the average DP ($DP_{av}$) or the base DP ($DP_b$), as desired. This coefficient value may correspond with a pre-determined criteria, for example, criteria that indicates a device malfunction, as shown in Equation (6) below:

$$DP_{av} > b \times DP_b, \quad \text{Equation (6)}$$

where b is the coefficient for purposes of this example. In one implementation, the stages may include a "false" positive detection that ensures that the operating condition actually prevails on the device. This detection may require multiple assignments, or "events," of the operating condition to occur in the algorithm. If below a threshold, for example, the method 200 may return to stage 202 to continue data collection and analysis.

At stage 216, the method 200 may generate the output in accordance with the operating condition. The output may embody any number of audio or visual cues to alert the end user about the condition of the gas meter 100. The subject matter of these cues may correspond with the severity of the operating condition, for example, an LED may illuminate or an alarm may sound on the gas meter 100 in response to maintenance or repair, respectively. For more serious malfunctions, the device may go inactive or enter into a reduced function mode that prevents certain (or all) functionality of the gas meter 100. Any of these specific responses may combine with others as well. In one implementation, the gas meter 100 may also generate a signal that encodes data, for example, an email or text message, that will resolve on a computing device or system, like an end user's laptop, smartphone, or tablet.

FIG. 8 depicts a flow diagram of an example of the method 200 with additional stages for diagnostics. These stages may occur once the gas meter completes the learning mode (at stages 206, 208 above). At stages 218 and 220, the method 200 may include stages for checking for stable flow. These stage may include stages for monitoring pulses consistent with the counter-rotating impellers 118, for example, by measuring a time period between consecutive pulses or comparing the time period between consecutive pulses to a maximum allowable value. The stages may also count consecutive pulses that meet the maximum allowable value and, where necessary, assume that flow is stable when the pulse count reaches a certain reasonable threshold level (e.g., 10 consecutive pulses).

If flow is stable, the method 200 may continue with further data collection functions. At stage 222, the method 200 may include stages for determining various test parameters for collecting data on the gas meter 100. These test parameters may include flow rate Q which may be calculated based on the distance between adjacent pulses from the counter-rotating impellers 118. Another test parameter may include the period T of the sinusoidal wave form of the measured DP data. The period T may relate to the flow rate Q. For example, assuming the flow rate Q is 2000 CF/hr on a gas meter 100 with a displacement of 0.025 CF, each full revolution of the impellers 118 takes 0.045 sec. The period T and frequency f of the sinusoidal wave form may be calculated according to Equations (7) and (8) below:

$$T = \frac{0.045}{4} = 0.011 \text{ sec}, \quad \text{Equation (7)}$$

$$f = \frac{1}{T} = \frac{1}{0.11} = 83.331. \quad \text{Equation (8)}$$

Still another test parameter is the "test time" for activating the DP sensor to collect the measured DP data. In one example, test time relates to the period T of the sinusoidal wave form, preferably as multiple of the period T (e.g., 2T, 4T, etc.). This feature ensures that the operation of the DP sensor starts and stops at similar places (albeit spaced apart over time) on the sinusoidal curve A (FIG. 6) discussed above.

The method 200 may use the test time (and other test parameters) with other functions. At stage 224, the method 200 may include stages for starting the timer (to count down the test time). The method 200 may continue, at stage 226, activating the DP sensor and, when necessary, other sensors that measure temperature T, pressure P, and specific gravity (SG) of the fluid (at stage 228). In one implementation, the method 200 may include, at stages 230, 232 checking (again) for stable flow and, if not stable, may include at stage 234 resetting the timer, at stage 236 deactivating the sensors 140, and at stage 238 deactivating the DP sensor. These stages may conclude any future data gathering until flow becomes stable again (at stage 218) Alternatively, if flow is stable and the timer has "expired" or reached the "test time" (at stage 240), then the method 200 may continue, at stage 242, validating the test cycle. In this way, the method 200 can continue operation with confidence that any collected data was gathered during stable flow and is "good" data to provide accurate diagnostics pursuant to the mathematical models for gas meter behavior discussed above.

Figure 9:
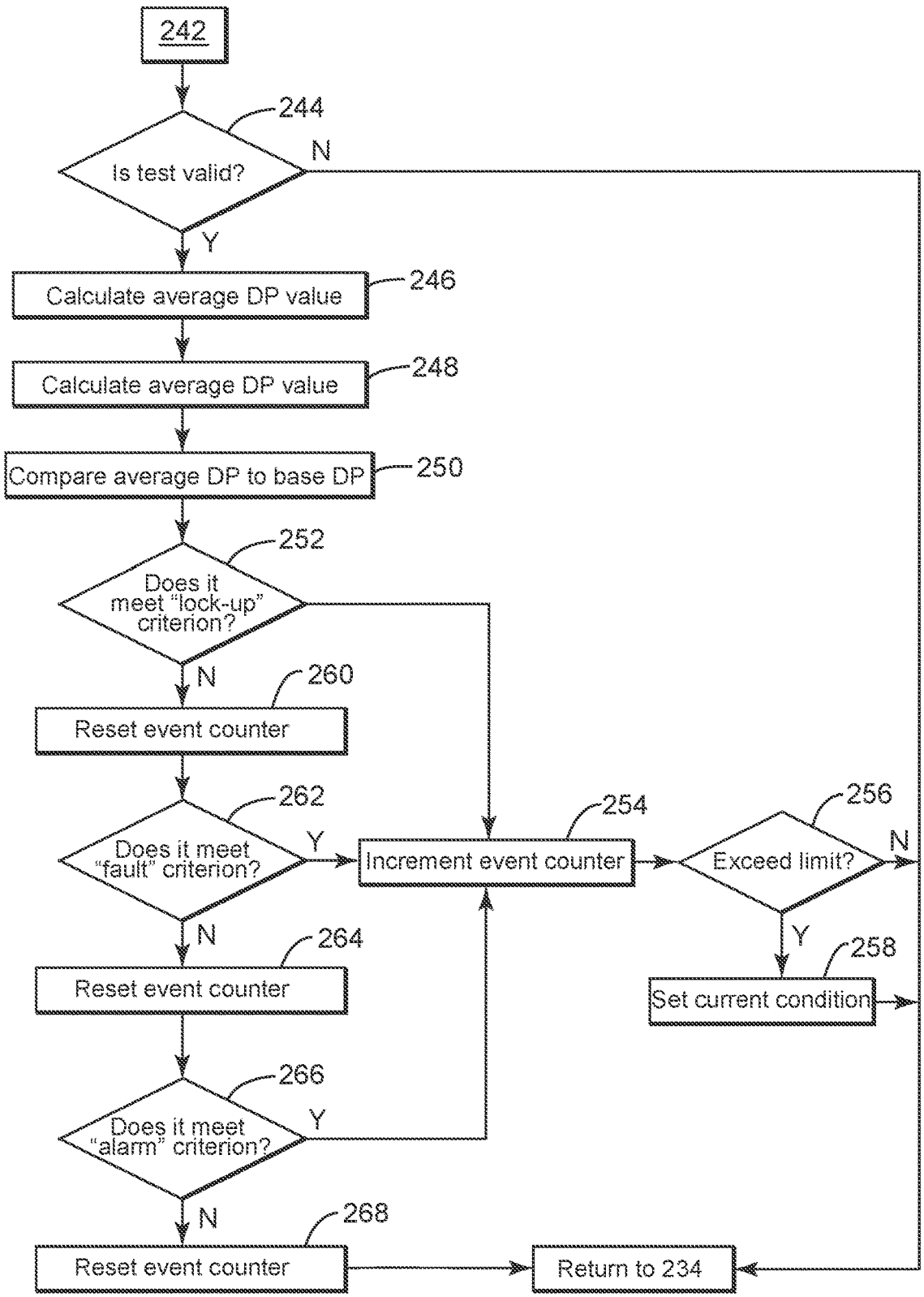
FIG. 9 depicts a flow diagram of an example of the method of FIG. 7.

FIG. 9 depicts a flow diagram of an example of the method 200. This example may continue, at stage 244, determining whether the test cycle is valid or complete and, if so, calculating average DP ($DP_{av}$) (at stage 246) and calculating base DP ($DP_b$) (at stage 248). The method 200 may also continue, at stage 250, comparing $DP_{av}$ and $DP_b$ to inform the remaining stages of diagnosis herein. At stage 252, determining whether the relationship between $DP_{av}$ and $DP_b$ indicates a "lock-up" operating condition, which occurs on the gas meter 100 when the impellers 118 can no longer rotate in the meter body 102. If so, the method 200 may continue, at stage 254, incrementing an event counter that aggregates the occurrence of the lock-up condition and, at stage 256, determining whether the event counter has exceeded a pre-determined limit. Values for the pre-determined limit may be set to avoid false positives, which may cause the method 200 to return to stage 230 (FIG. 8), resetting the system for purposes of gathering a new sample set of data during stable flow. If affirmative, the method 200 may include, at stage 258, setting a "current condition" for the operating condition and (where applicable) activate the output discussed above. This current condition may reflect "lock-up" of the impellers 118, malfunction of the DP sensor, or other indication (e.g., "DP alarm") that there is problems (or potential problems) on the device. When the lock-up condition is not met, the method 200 may continue at stage 260, resetting the event counter. The method 200 may further include, at stage 262 determining whether the relationship between $DP_{av}$ and $DP_b$ indicates the "fault" condition and, further continue at stage 254, 256, 258 to provide an appropriate response to the same. As also shown, if the fault condition is not met, the method 200 may also reset the counter (at stage 264) and continue, at stage 266, determining whether the relationship between the $DP_{av}$ and $DP_b$ indicates the "alarm" condition. This condition may give way to stages 254, 256, 258 as appropriate. Further, if none of the conditions are met, the method 200 may continue at stage 268, resetting the counter, and return to stage 234 to continue the data collection process, for example, during the next period of stable flow or test time period.

Figure 10:
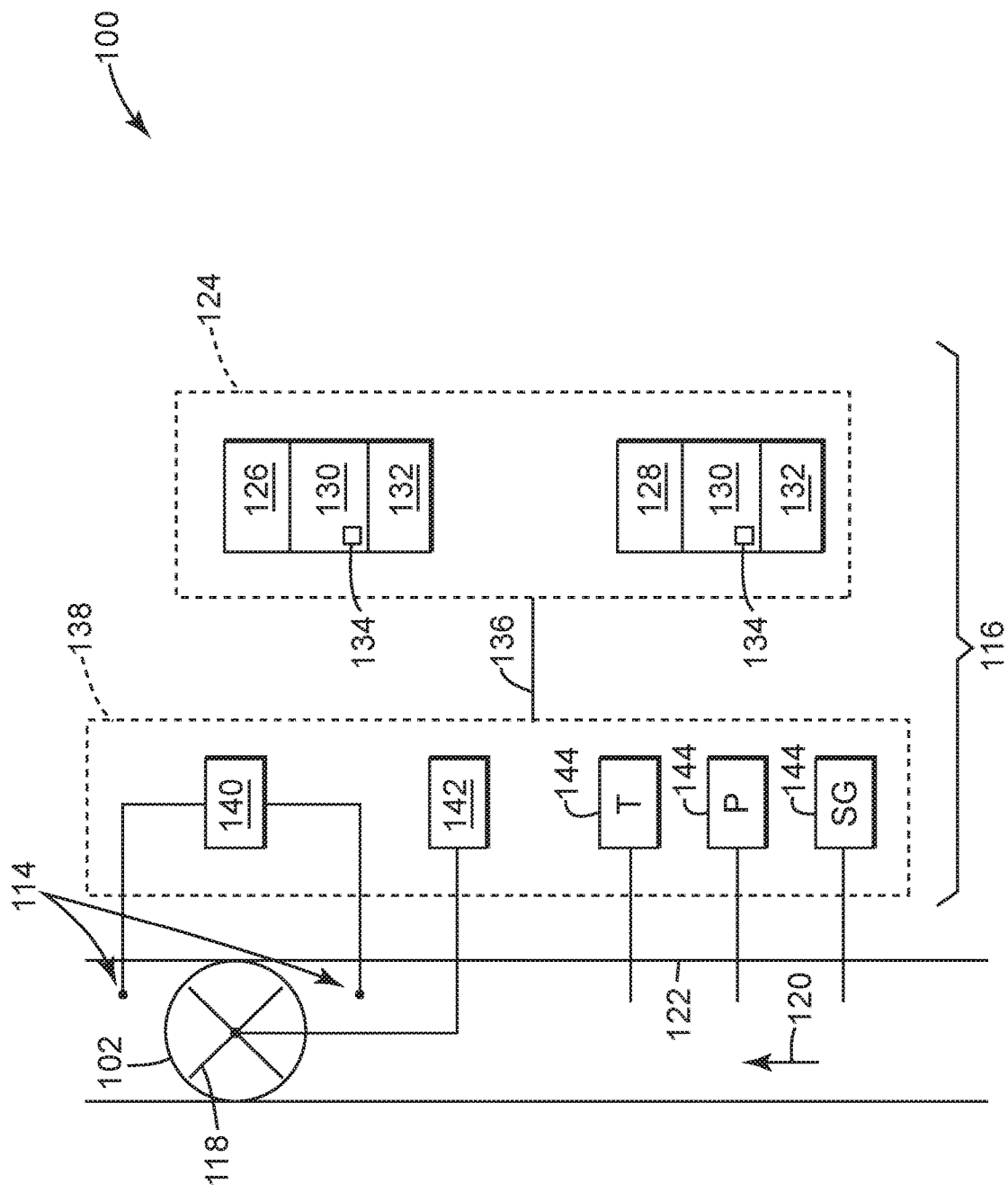
FIG. 10 depicts a schematic diagram of an example of the gas meter of FIG. 1.

FIG. 10 schematically depicts an example of the gas meter 100 of FIG. 1. As shown, the electronics unit 116 may include a processing unit 124 with a pair of processors (e.g., a first processor 126 and a second processor 128). The processors 126, 128 may each have their own "computing structure" with a memory 130 and a dedicated power supply 132, as desired. This computing structure may take the form of a fully-integrated micro-processor. Executable instructions 134 may reside on the memory 130. A buss structure 136 may couple the processing unit 124 with a sensor unit 138 to allow exchange of data and information, shown generally as signals (in analog or digital formats), including request data SR and measurement data SM. The sensor unit 138 may include various sensors that generate the data signals SR, SM. The sensors may include the DP sensor 140 that couples with the DP unit 114. Other sensors may include motion sensors 142 or fluid condition sensors 144. The sensors 142, 144 may provide data that relates to flow of fluid 140 through conduit 122. In one implementation, measurement signals SM from the motion sensors 142 may correspond with rotation of the impellers 118 in response to flow of fluid 120 in the flow path 104. The fluid condition sensors 144 may generate measurement signals SM that describe temperature T, pressure P, or specific gravity SG.

Figure 11:
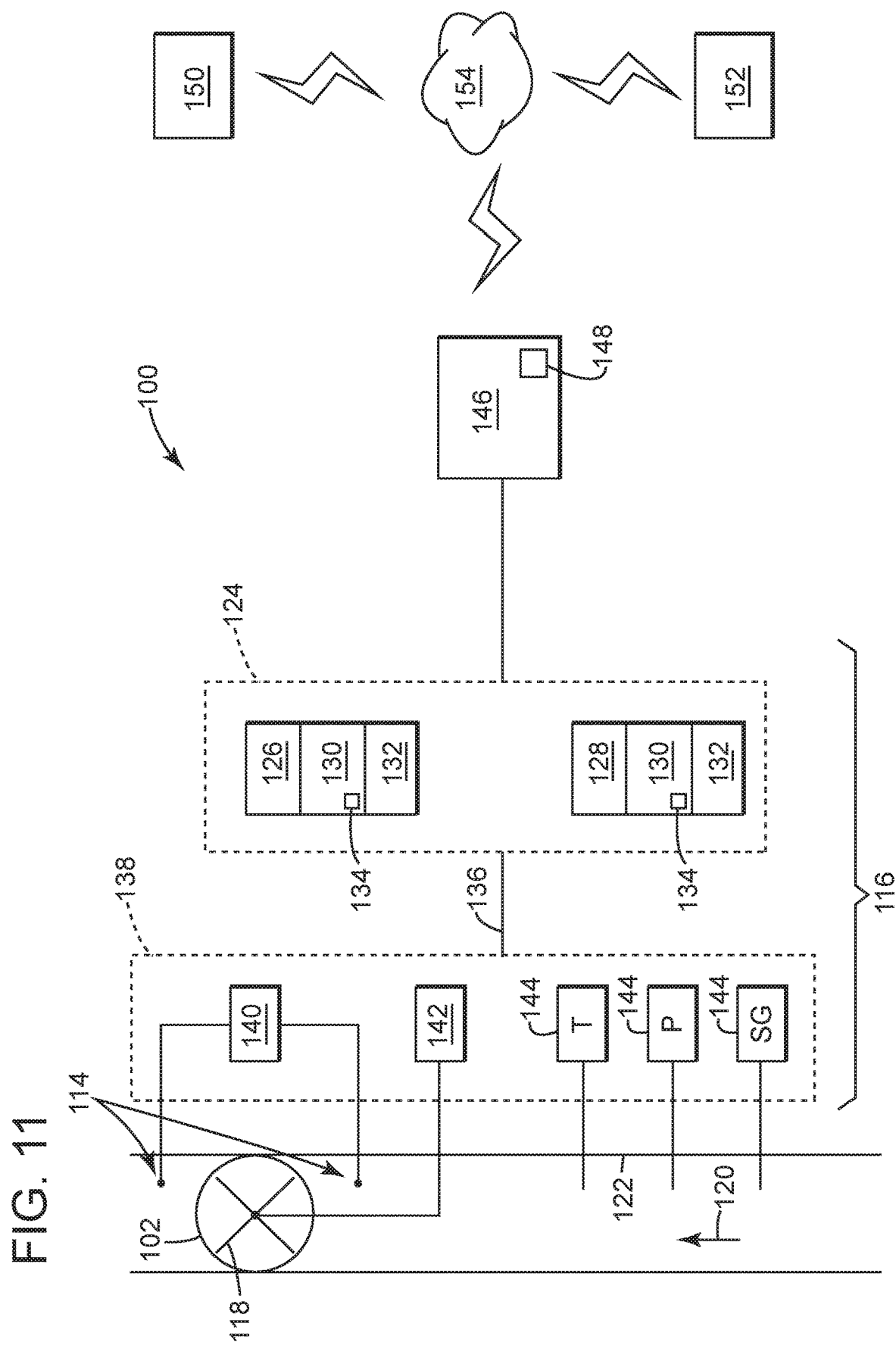
FIG. 11 depicts a schematic diagram of the example of FIG. 10.

FIG. 11 schematically depicts an example of the gas meter 100 of FIG. 10. The electronics unit 116 may include a communication unit 146 with antenna 148 that may send and receive signals, including incoming signals Si and outbound signals So. Examples of the antenna 148 may operate with various wireless formats, including long-range and short-range formats. In one implementation, these formats are useful to exchange data with remote devices, for example, a mobile device 150 (via Bluetooth®) or a remote server 152 via a network 154.

Figure 12:
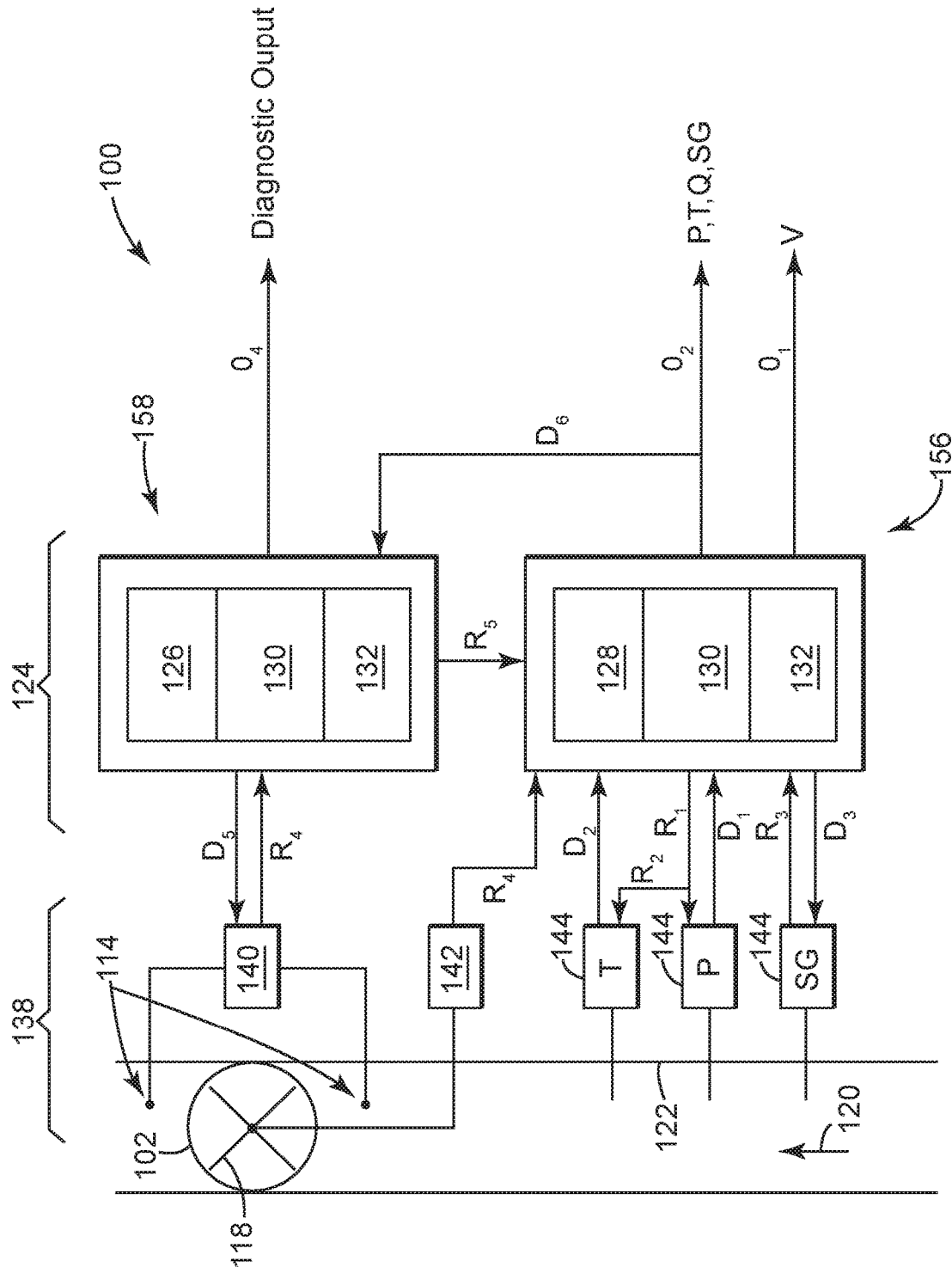
FIG. 12 depicts a schematic diagram of the example of FIG. 10.
Figure 13:
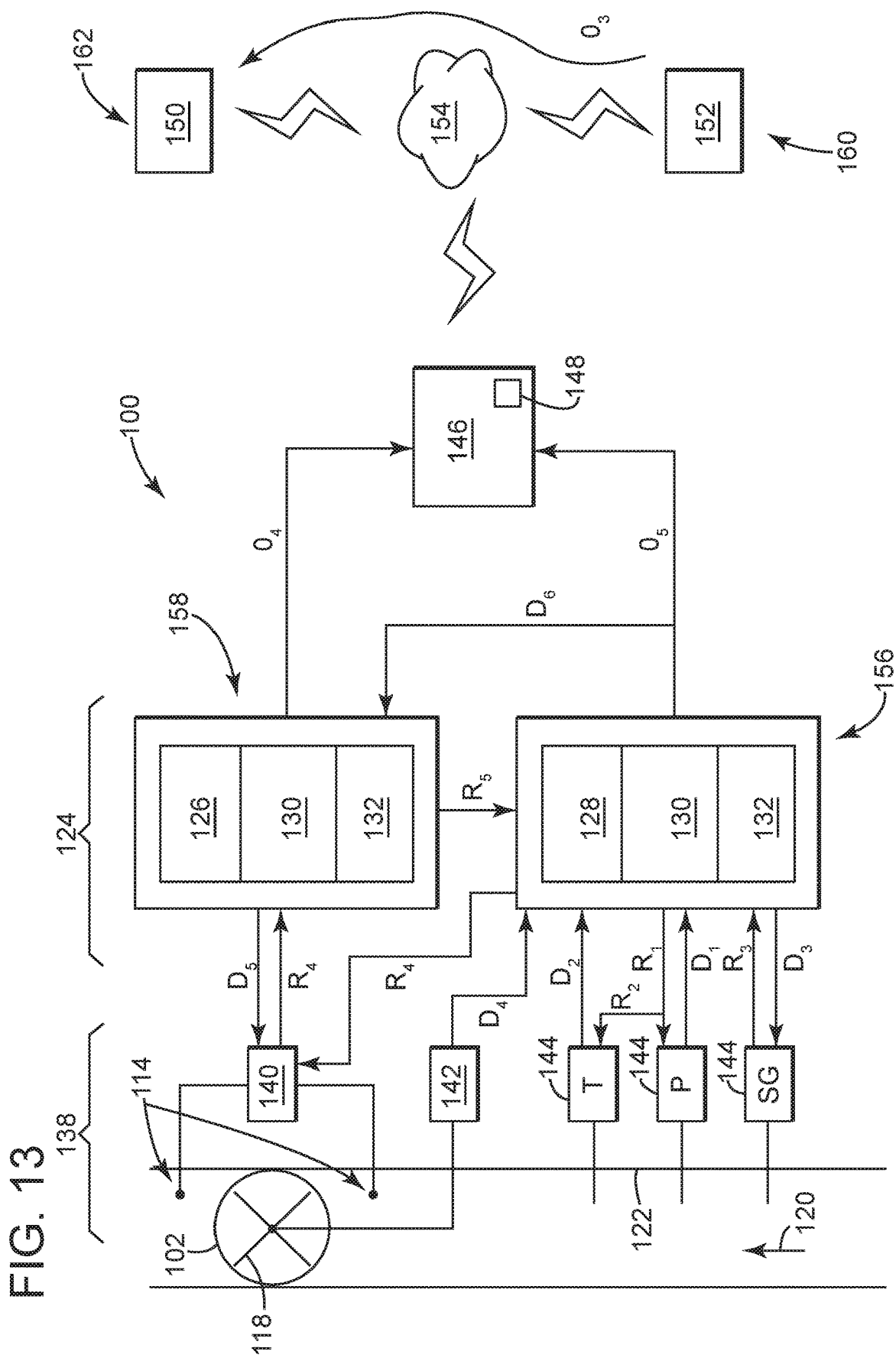
FIG. 13 depicts a schematic diagram of the example of FIG. 12.

FIGS. 12 and 13 schematically depict an application of the gas meter 100 of FIG. 10. This application deploys processors 126, 128 individually as a volume processor 156 and a diagnostics processor 158. The volume processor 156 is configured, through executable instructions 134, to request (R) data from various components of the sensor unit 138. In one implementation, requests $R_1$ and $R_2$ are made at a known time-constant interval (e.g., thirty (30) seconds) to obtain data $D_1$ and $D_2$ from the temperature and pressure sensors P. Request $R_3$ obtains data $D_3$ from the specific gravity sensor SG. The device may collect data $D_4$ from the motion sensor 142 without the need for any request; but this does not always have to be the case. The volume processor 156 can use this data (also through executable instructions 134) to generate a volume output $O_1$, for example, values for volumetric flow. In one example, the volume processor 156 may also generate a parameter output $O_2$ that passes parameter values (e.g., temperature, pressure, specific gravity (or other parameters of gas composition), flow rate, etc.) onto other parts of the device or into the network 154 (FIG. 3). It may benefit the design for volume processor 156 to have additional capabilities to "correct" the values to take into consideration localized temperature and pressure parameters, as well. As also shown, request $R_4$ causes the DP sensor 140 to transmit data $D_5$ to the diagnostics processor 158. This device can use DP data in combination with other parameter data $D_6$ to generate diagnostics output $O_3$. As best shown in FIG. 13, the processors 156, 158 may forego any data processing in lieu of a "cloud" based system that delivers outputs $O_4$, $O_5$, typically raw data for DP, pressure, temperature, and specific gravity (or other parameters of gas composition), to a diagnostic server 160 for data processing that delivers the diagnostic output $O_3$ to a back office system 162.

Figure 14:
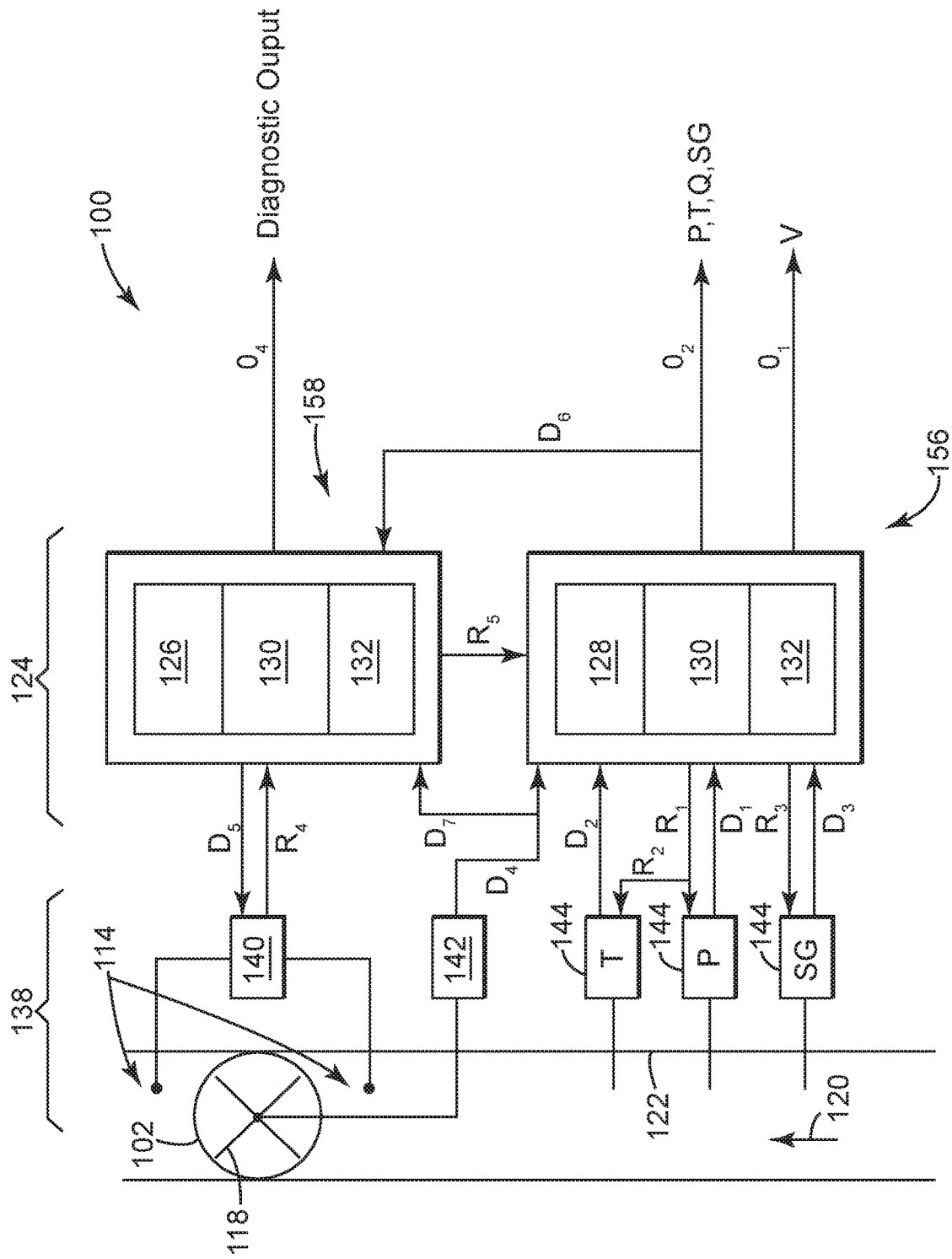
FIG. 14 depicts a schematic diagram of the example of FIG. 10.
Figure 15:
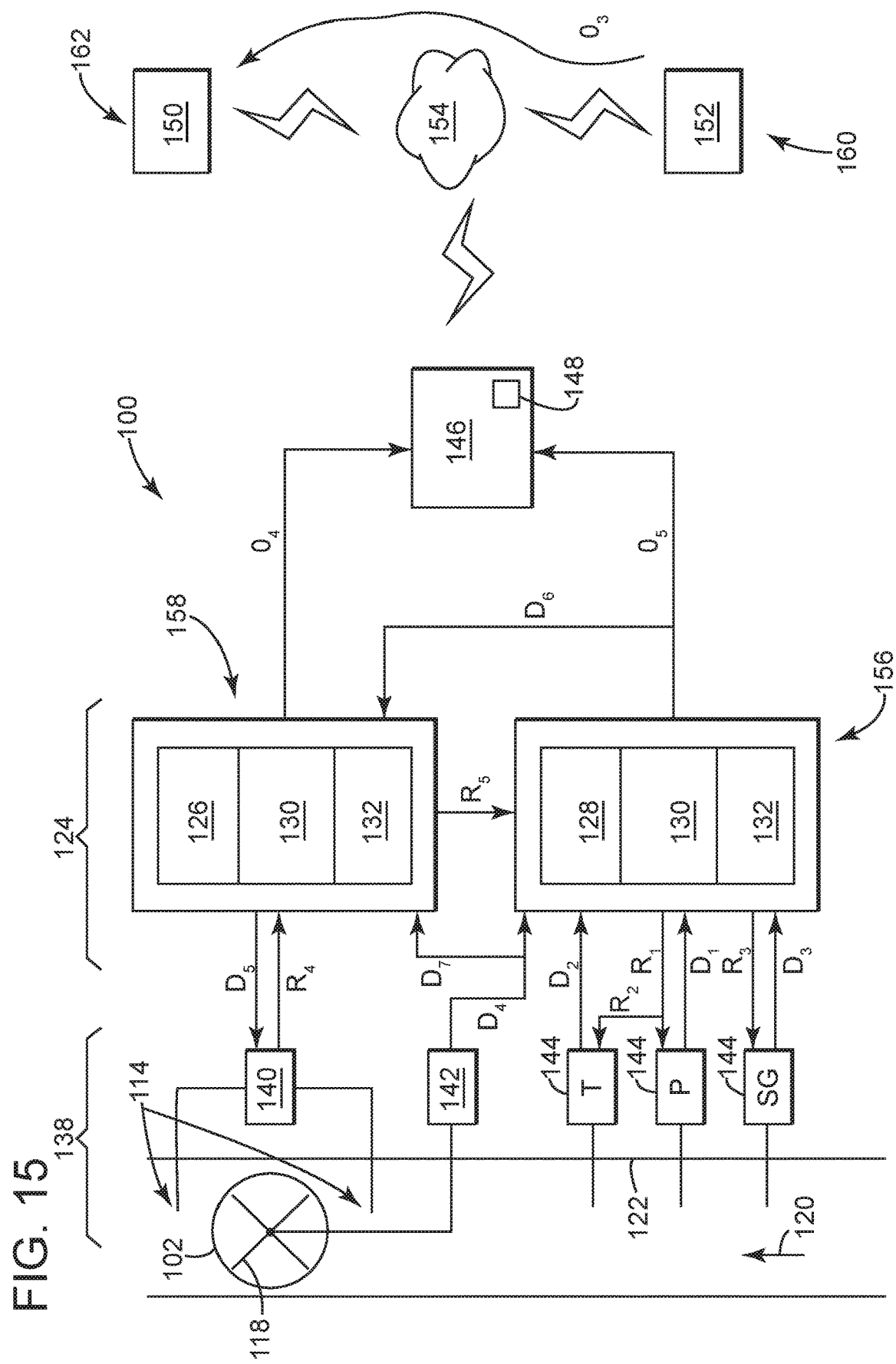
FIG. 15 depicts a schematic diagram of the example of FIG. 14.

FIGS. 14 and 15 schematically depicts another application of the gas meter 100 of FIG. 10. Here, the diagnostics processor 158 manages requests $R_4$ for data $D_4$ from the DP sensor 140. The diagnostics processor 158 also receives data $D_7$ from the motion sensor 142. In one implementation, this device also acquires parameter data $D_6$ in response to request $R_5$, also on an intermitted schedule (e.g., thirty (30) seconds). Like FIG. 13 above, the processors 156, 158 may deploy as part of a "cloud" based system to deliver raw data to remotely located diagnostic server 160.

In light of the foregoing, the embodiments herein may enhance diagnostics. A technical effect is to influence operation of the DP sensor, causing it to activate and deactivate at opportune times so as to gather better "good" data and save energy.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A method, comprising:
monitoring a flow of fluid across impellers on a gas meter;
identifying a period of stable flow;
operating a differential pressure sensor during the period of stable flow by,
calculating a fixed test time, which is a multiple of a period T of a sinusoidal wave that describes the flow of fluid across the impellers;
activating the differential pressure sensor at the beginning of the fixed test time;
deactivating the differential pressure sensor at the end of the fixed test time;
calculating diagnostic values from data from the differential pressure sensor; and
generating an output that corresponds with an operating condition that relates to a relationship between the diagnostic values.

2. The method of claim 1, further comprising:
calculating a constant for a mathematical model of gas meter behavior from data from the differential pressure sensor, wherein execution of the mathematical model results in the diagnostic values include a base value for differential pressure that includes the constant.

3. The method of claim 1, further comprising:
completing a learning mode that results in a constant for a mathematical model of gas meter behavior, wherein the diagnostic values require the constant.

4. The method of claim 1, wherein the diagnostic values include a base value for differential pressure and an average value for differential pressure.

5. The method of claim 1, further comprising:
gathering parameter data that relates to temperature, pressure, and specific gravity of the fluid during the period of stable flow, wherein the diagnostic values require the parameter data.

6. The method of claim 1, further comprising:
comparing the relationship to an event criterion that defines the operating condition.

7. The method of claim 1, wherein the operating condition identifies lock-up of the impellers.

8. The method of claim 1, further comprising:
incrementing an event counter when the relationship satisfies an event criterion; and
setting the operating parameter when the event counter exceeds a pre-determined limit.

9. The method of claim 1, the multiple of the period T is 2.

10. The method of claim 1, further comprising:
activating a timer to measure a fixed test time,
wherein the differential pressure sensor only operates during the fixed test time.

11. A gas meter, comprising:
a meter body with a pair of counter-rotating impellers;
an electronics unit attached to the meter body, the electronics unit comprising a processor, memory, and executable instructions stored on the memory;
a differential pressure sensor disposed in the electronics unit; and
a differential pressure unit that directs a sample of fluid from an upstream side and a downstream side of the pair of counter-rotating impellers to the differential pressure sensor,
wherein the executable instructions configure the processor to operate the differential pressure sensor only during a period of stable flow across the pair of counter-rotating impellers by,
calculating a fixed test time, which is a multiple of a period T of a sinusoidal wave that describes the flow of fluid across the impellers;
activating the differential pressure sensor at the beginning of the fixed test time; and
deactivating the differential pressure sensor at the end of the fixed test time.

12. The gas meter of claim 11, further comprising:
a temperature sensor and a pressure sensor, wherein the executable instructions configure the processor to operate the temperature sensor and pressure sensor only during a period of stable flow across the pair of counter-rotating impellers.

13. The gas meter of claim 11, wherein the executable instructions configure the processor to calculate diagnostic values from data from the differential pressure sensor and generate an output that corresponds with an operating condition that relates to a relationship between the diagnostic values.

14. The gas meter of claim 13, wherein the diagnostic values include a base value for differential pressure and an average value for differential pressure.

15. The gas meter of claim 13, wherein the executable instructions configure the processor to gather parameter data that relates to temperature, pressure, and specific gravity of the fluid during the period of stable flow, wherein the diagnostic values require the parameter data.

16. The gas meter of claim 13, wherein the executable instructions configure the processor to compare the relationship to an event criterion that defines the operating condition.

17. The gas meter of claim 13, wherein the executable instructions configure the processor to increment an event counter when the relationship satisfies an event criterion and set the operating parameter when the event counter exceeds a pre-determined limit.

18. The gas meter of claim 13, wherein the diagnostic values relate to data gathered during a fixed test time.

19. The gas meter of claim 11, wherein the executable instructions configure the processor to calculate a constant for a mathematical model of gas meter behavior with data from the differential pressure sensor, wherein the diagnostic values include a base value for differential pressure that includes the constants.

20. The gas meter of claim 11, wherein the executable instructions configure the processor to complete a learning mode that results in a constant for a mathematical model of gas meter behavior, wherein the diagnostic values require the constant.

* * * * *